US008759995B2

(12) United States Patent
García Sayés et al.

(10) Patent No.: US 8,759,995 B2
(45) Date of Patent: Jun. 24, 2014

(54) CONTROL METHOD OF A WIND TURBINE GENERATOR

(71) Applicant: Acciona Windpower, S. A., Navarra (ES)

(72) Inventors: José Miguel García Sayés, Sarriguren (ES); Teresa Arlabán Gabeiras, Sarriguren (ES); Miguel Núñez Polo, Sarriguren (ES)

(73) Assignee: Acciona Windpower, S.A., Sarriguren, Navarra (ES)

( * ) Notice: Subject to any disclaimer, the term of this patent is extended or adjusted under 35 U.S.C. 154(b) by 54 days.

(21) Appl. No.: 13/712,557

(22) Filed: Dec. 12, 2012

(65) Prior Publication Data

US 2013/0169241 A1   Jul. 4, 2013

(30) Foreign Application Priority Data

Dec. 12, 2011   (ES) .................................. 201131997

(51) Int. Cl.
*F03D 9/00* (2006.01)
(52) U.S. Cl.
USPC ............................................. 290/44; 322/20
(58) Field of Classification Search
USPC ........................................ 290/43, 44; 322/20
See application file for complete search history.

(56) References Cited

U.S. PATENT DOCUMENTS

| 4,695,736 | A  | * | 9/1987 | Doman et al. | 290/44 |
| 6,909,198 | B2 | * | 6/2005 | Ragwitz et al. | 290/44 |
| 7,095,131 | B2 | * | 8/2006 | Mikhail et al. | 290/44 |
| 7,352,075 | B2 | * | 4/2008 | Willey et al. | 290/44 |
| 7,528,496 | B2 | * | 5/2009 | Fortmann | 290/44 |
| 7,880,320 | B2 | * | 2/2011 | Cook | 290/44 |
| 7,898,099 | B2 | * | 3/2011 | Stiesdal | 290/44 |
| 7,952,216 | B2 | * | 5/2011 | Kikuchi et al. | 290/44 |
| 8,258,643 | B2 | * | 9/2012 | Bonnet | 290/44 |
| 2008/0307853 | A1 | * | 12/2008 | Siebers et al. | 73/1.29 |

FOREIGN PATENT DOCUMENTS

WO    WO 2007/053031 A1    5/2007

* cited by examiner

*Primary Examiner* — Nicholas Ponomarenko
(74) *Attorney, Agent, or Firm* — Birch, Stewart, Kolasch & Birch, LLP

(57) ABSTRACT

The control method of a wind turbine generator increases the speed range of wind turbine generators, maximizing the operation and efficiency thereof, in addition to lengthening their service life, on minimizing the extreme and fatigue loads to which the wind turbine generators are subject, and which are due mainly to the stops and disconnections thereof as a result of strong gusts of wind. More specifically, the control method of the present invention stands out essentially for being based on the control of the reactive current circulating through the electric generator, said reactive current control being carried out in accordance with the rotational speed ($\omega_g$) for the purpose of reducing the voltage at the converter terminals on the generator side, or rotor voltage ($V_R$), which ultimately allows a transitional increase in the speed range of the wind turbine generator.

20 Claims, 6 Drawing Sheets

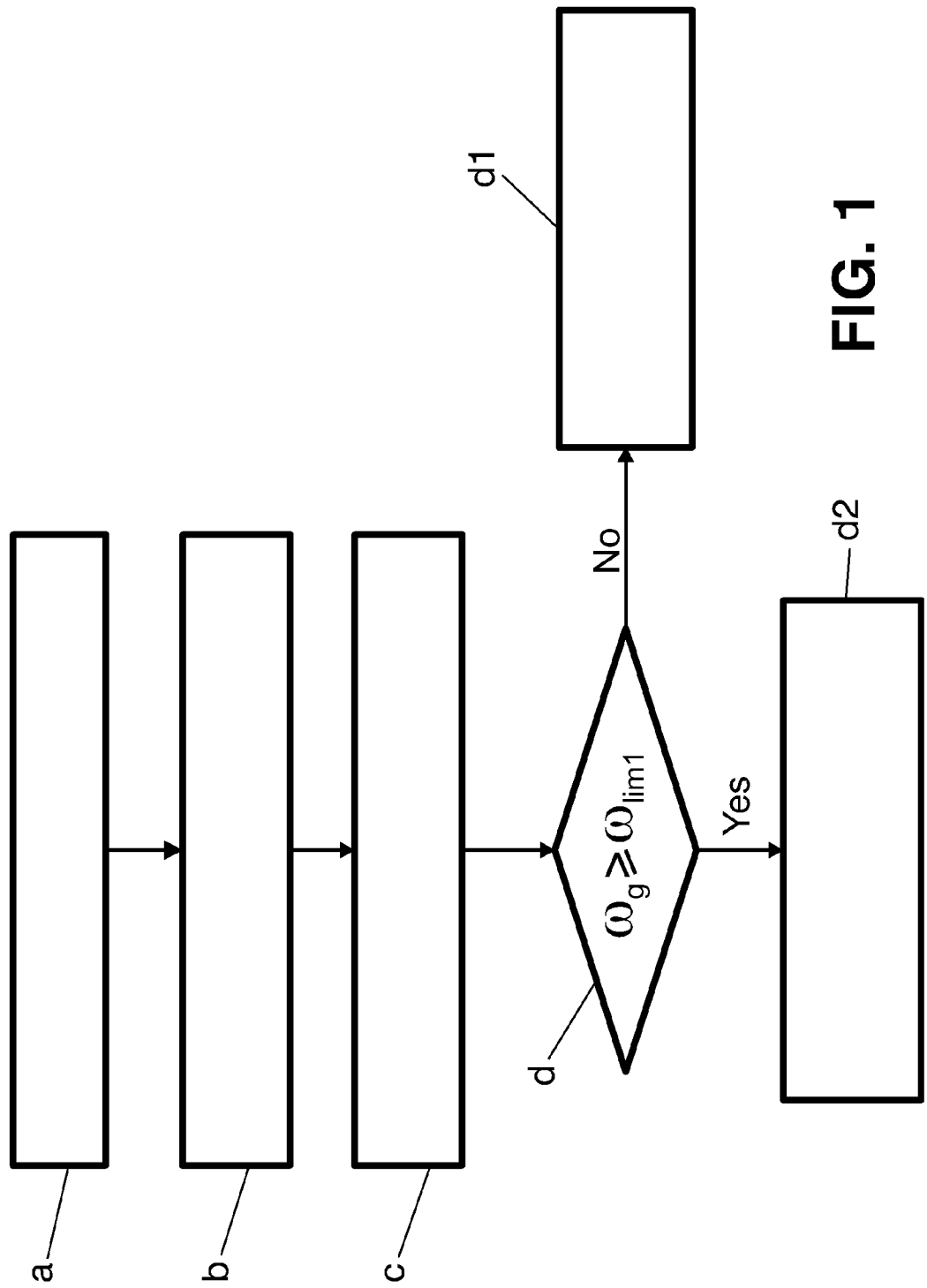

CONTROL METHOD OF A WIND TURBINE GENERATOR

OBJECT OF THE INVENTION

The present invention relates to the field of wind turbine generators and, more specifically, to methods for controlling and/or regulating the power generated.

The main object of the present invention is a control method of a wind turbine generator which transitionally increases its speed range and, therefore, extends the operation and efficiency of the wind turbine generator to above the overspeed threshold value.

BACKGROUND OF THE INVENTION

At present, renewable energy sources have become consolidated as the strongest alternative to conventional energy sources for generating electricity, one of the most efficient of which is wind energy. Wind energy is that which allows generation of electricity using generators or wind turbines. Said wind turbine generators are basically composed of a tower, a gondola disposed at the top of the tower that houses the electric generator and a rotor disposed at the front of the gondola, formed in turn by at least two blades.

In general, wind turbine generators comprise active systems for controlling the power generated in the blades. Said control systems limit the wind power captured when it exceeds a certain threshold value at which the wind turbine generator reaches its rated power. The most frequently used system is that which controls the angle of attack of the blade, commonly known as "pitch" system.

The blade pitch is configured to rotate the blade from a position of maximum energy capture or "fine pitch" to a position where the incoming torque is cancelled, or feather position. Traditionally, the blade pitch is in charge of controlling wind turbine generator rotational speed when it reaches its rated power. Therefore, based on a speed error between the measured rotational speed and a rated rotational speed, a control unit of the wind turbine generator calculates a position or pitch speed set point that it sends to the pitch system in order to maintain a constant rotational speed.

Under exceptional circumstances, such as for example strong gusts of wind in which there is a sudden, sharp increase in wind speed, wind rotor "overspeeds" can occur, i.e. the rotor rotates at higher speeds than for which it was designed, due to the fact that the pitch system is not dimensioned to increase the blade pitch and, consequently, it is incapable of limiting the power captured with sufficient speed. On these occasions, the undesired effect of a stop in the wind turbine generator takes place, which can be emergency or controlled. In either case, a certain time interval elapses until the wind turbine generator starts up again and generates power. In addition, in both cases extreme and fatigue loads are produced that considerably reduce and minimise the service life of the wind turbine generator.

More specifically, the rotor speed at which the wind turbine generators stop is generally determined by electrical operating limits. In said wind turbine generators, the electric generator is connected to the grid through an electronic power converter that enables independent control of the active and reactive current generated. In general, the active current is the parameter to be taken into account to control the torque in an electric generator connected to the grid through a converter (controlling the torque enables control of rotor rotational speed). Specifically, both in doubly-fed wind turbine generators (DFIG or doubly-fed induction generator) and in wind turbine generators connected to the grid through a full power converter (FC), the limit used is the voltage at the converter terminals on the machine side due to the fact that, upon exceeding certain safety margins with respect to the voltage of the DC bus thereof, control of the wind turbine generator is lost.

On the other hand, offshore wind turbine generator installations have proliferated in recent years, which are installed in deep sea through the use of floating platforms as a base for the wind turbine generators. In these cases, due to the fact that the platform is not rigidly joined to the seabed, but rather can move somewhat in relation thereto, it is usual for the assembly formed by the wind turbine generator and the floating platform to swing back and forth like a pendulum, as a consequence of the effect of the wind and waves. Said oscillating movement causes the wind incident upon the surface of the wind rotor to affect rotor rotational speed, i.e. as the wind turbine generator tilts forward the wind incident thereupon increases, thus increasing rotational speed; conversely, on tilting backward, the wind incident upon the wind turbine generator blades decreases and, thus, rotor rotational speed.

The variations in rotor speed negatively affect both the life span of the wind turbine generator and speed control using pitch, whereupon the bandwidth of the corresponding control loop is reduced: on responding to variations in rotational speed in relation to an average speed value, the capacity to control said average rotational speed using the pitch system leads to more frequent stops due to overspeed. International application PCT WO2007/053031A1 discloses this problem: "A method for damping vibrations in a wind turbine generator installation" (Norsk Hydro).

DESCRIPTION OF THE INVENTION

The present invention resolves the aforementioned drawbacks by providing a control method of a wind turbine generator in order to obtain a wide transition speed range in said wind turbine generator. More specifically, said control method substantially reduces the number of wind turbine generator stops in those cases where wind speed exceeds a certain threshold value and causes "overspeeds" in the wind rotor of said wind turbine generators. Further, in addition to increasing the speed range and maximising operation of the wind turbine generators, the control method object of the invention also lengthens their service life, due to the fact that the extreme and fatigue loads to which the wind turbine generators are subject, resulting from the constant stops and disconnections thereof as a consequence of strong gusts of wind, are reduced.

The control method described herein is applicable to wind turbine generators of the type comprising a wind rotor, at least two blades linked with said wind rotor, an electric generator, a control unit and a power converter that connects the electric generator to the grid. More specifically, the control method object of the invention is based on the control of the reactive current circulating through the electric generator, said control of the reactive current being based on wind turbine generator rotational speed for the purpose of reducing the voltage at the converter terminals on the generator side, also called rotor voltage, which ultimately allows a transitional increase in the speed range of the wind turbine generator.

The control method of the present invention basically comprises the following stages: calculating a wind turbine generator rotational speed; establishing a first reactive current set point; establishing a second, preferably inductive, reactive current set point; and comparing wind turbine generator rotational speed with a first predetermined speed limit value. In accordance with the result obtained from said comparison, one of the following options will be followed:

application of the first reactive current set point for controlling the generator in the event that wind turbine generator rotational speed is lower than the first speed limit value; and application of the second reactive current set point for controlling the generator in the event that wind turbine generator rotational speed is greater than or equal to the first speed limit value.

In accordance with a preferred embodiment, the first reactive current set point is calculated based on a reactive power set point or a power factor set point. Also preferably, it has been envisaged that the reactive power value or power factor value for calculating the first reactive current set point be calculated based on a voltage controller, the parameters of which are configured according to grid integration requirements determined by law.

Moreover, it should be noted that the time period in which a wind turbine generator can operate above a speed limit value is limited for safety reasons, as the load level borne by the wind turbine generator at those speed levels is high. For this reason, it has been envisaged that the control method object of the invention additionally comprises the following steps:

calculation of the time interval during which wind turbine generator rotational speed is higher than the first speed limit;

comparison of said calculated time interval with a maximum predetermined time interval; and disconnection of the wind turbine generator in the event that said time interval is greater than the maximum predetermined time interval.

Also for safety reasons, it has been envisaged that the control method described herein additionally comprises the following stages:

comparison of wind turbine generator rotational speed with a second predetermined speed limit value greater than the first speed limit value; and disconnection of the wind turbine generator in the event that rotational speed ($\omega_g$) is greater than the second speed limit value ($\omega_{lim2}$).

Lastly, it must be mentioned that the control method of the present invention is applicable both in DFIG (doubly fed induction generator) wind turbine generators and FC (full converter) wind turbine generators.

Therefore, the control method object of the invention provides a cost-effective solution which allows the continuous and controlled action of a wind turbine generator, considerably reducing the number of stops of the wind turbine generators, caused by certain extreme situations or events, such as strong gusts of wind. In this manner, the control method object of the invention object of the invention maximises the amount of energy obtained by the wind turbine generators and lengthens their service life on avoiding the extreme and fatigue loads produced by the constant emergency stops when generator speed exceeds a certain threshold value.

DESCRIPTION OF THE DRAWINGS

In order to complete the description being made and with the object of helping to better understand the characteristics of the invention, in accordance with a preferred example of practical embodiment thereof, accompanying said description as an integral part thereof, is a set of drawings wherein the following has been represented in an illustrative and non-limiting manner:

FIG. 1 shows a flow chart of the control method according to the invention.

PREFERRED EMBODIMENT OF THE INVENTION

Following is a description of a preferred embodiment making reference to the aforementioned figures, without implying any limitation whatsoever within the scope of protection of the present invention. Throughout said embodiment, threshold is understood to be a threshold value, signal is understood to be a value of said signal and set point is understood to be a set point value, thereby shortening the definitions to the extent that the nomenclature of each of said elements (threshold, signal, set point) actually corresponds to a value of each element.

FIG. 1 shows a flow diagram of the control method object of the invention. More specifically, said control method for transitionally increasing the speed range of a wind turbine generator comprises the following stages:

a) determining a signal indicative of wind turbine generator rotational speed ($\omega_g$);

b) establishing a first reactive current and/or power set point (idref1, Qref1);

c) establishing a second reactive current and/or power set point (idref2, Qref2);

d) comparing the signal indicative of rotational speed ($\omega_g$) with a first predetermined limit value, in such a manner as to proceed according to one of the following substages:

d1) application of the first reactive current and/or power set point (idref1, Qref1) for controlling the generator in the event that the signal indicative of rotational speed ($\omega_g$) calculated in stage a) is lower than the first limit value; and d2) application of the second reactive current and/or power set point (idref2, Qref2) for controlling the generator in the event that the signal indicative of rotational speed ($\omega_g$) calculated in stage a) is greater than or equal to the first limit value.

Figure 5:
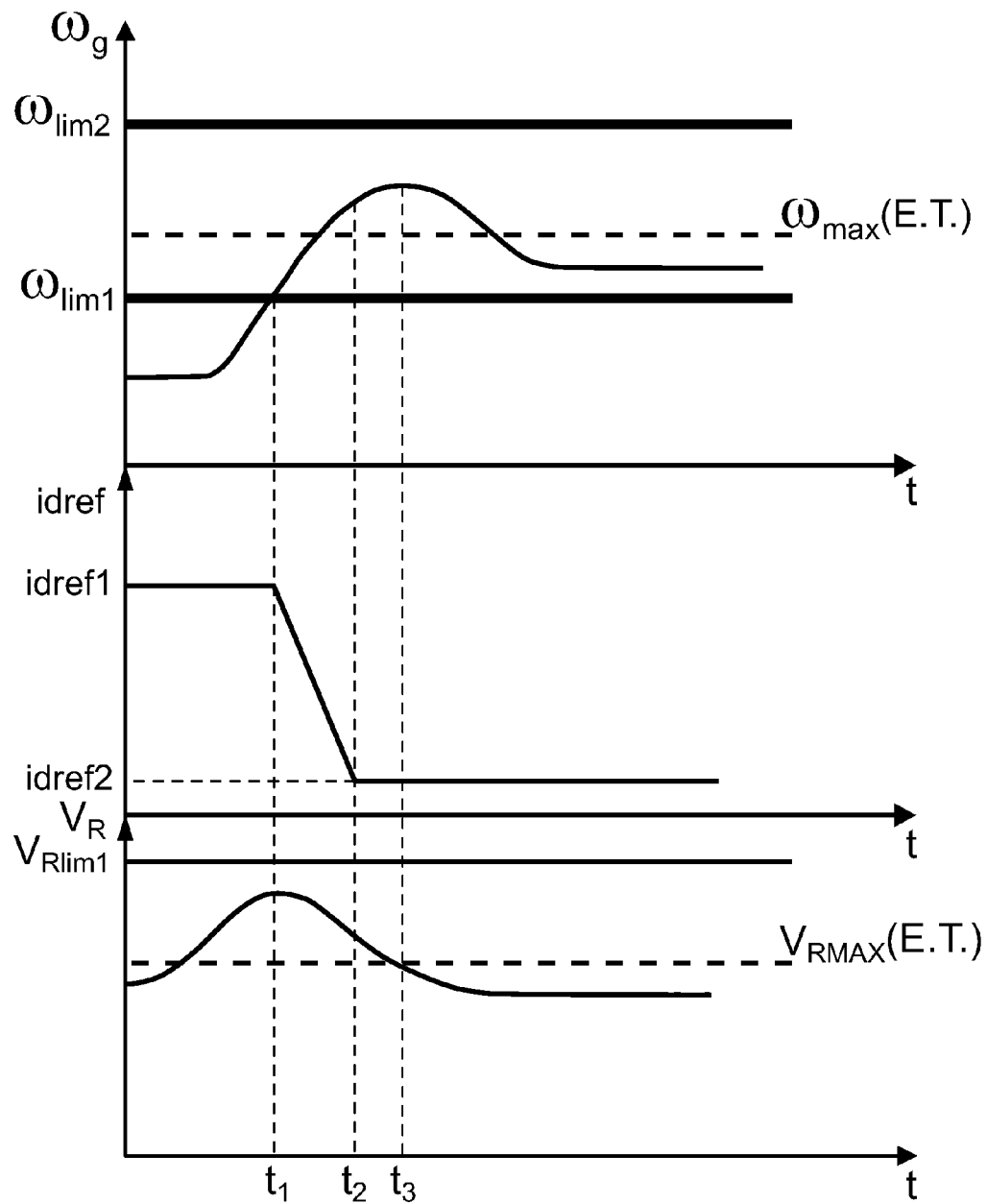
FIG. 5 shows an operation diagram of a wind turbine generator according to the control method of the present invention.
Figure 6:
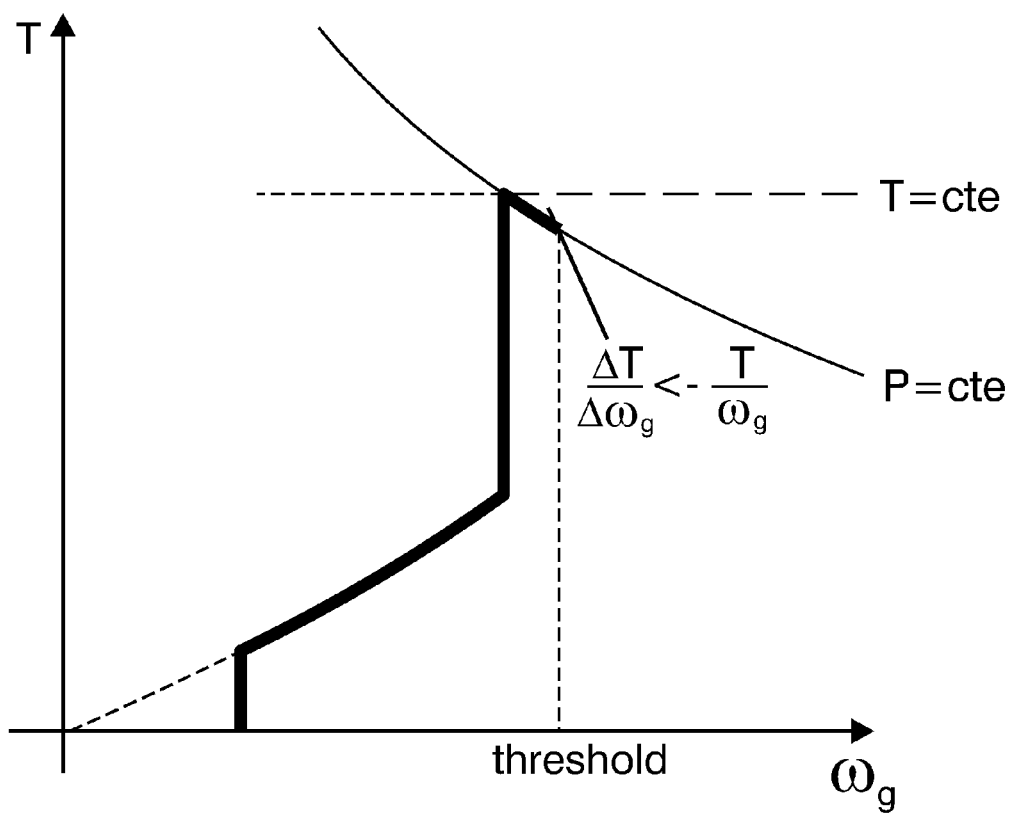
FIG. 6 shows a torque demand curve for the electric generator with respect to rotational speed.

The signal indicative of rotational speed ($\omega_g$) is, according to a preferred embodiment, the rotational speed ($\omega_g$) itself measured directly at the generator axis, while the first limit value with which it is compared is also a speed value ($\omega_{lim1}$), shown in FIG. 5.

Nevertheless, in accordance with another preferred embodiment, said signal indicative of rotational speed ($\omega_g$) is a voltage measurement made at the converter terminals on the generator side or rotor voltage ($V_R$), being the first limit value with which a limit converter voltage value ($V_{Rlim1}$) is compared, also shown in FIG. 5.

Additionally, it has been envisaged that, according to a preferred embodiment of the second reactive current or power set point (idref2, Qref2) be inductive.

Further, it must be recalled that wind turbine generator control systems normally include various controllers for controlling different components. Therefore, wind turbine generators normally have a wind turbine generator controller (PLC) in charge of the wind turbine generator's global control functions and a power converter (CCU) control unit which, in accordance with the active and reactive power control set points received by the wind turbine generator control unit (PLC), calculates generator currents in accordance with the appropriate switching of the switching elements of the wind turbine generator converter.

Figure 2A:
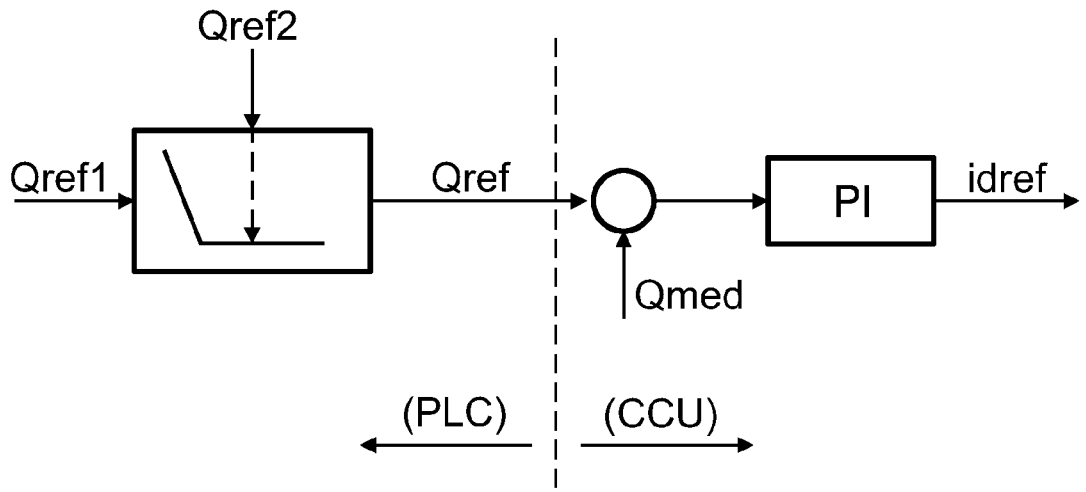
FIGS. 2A and 2B show two preferred embodiments where the first and second set points are reactive power set points calculated in the control unit of the PLC wind turbine generator.
Figure 2B:
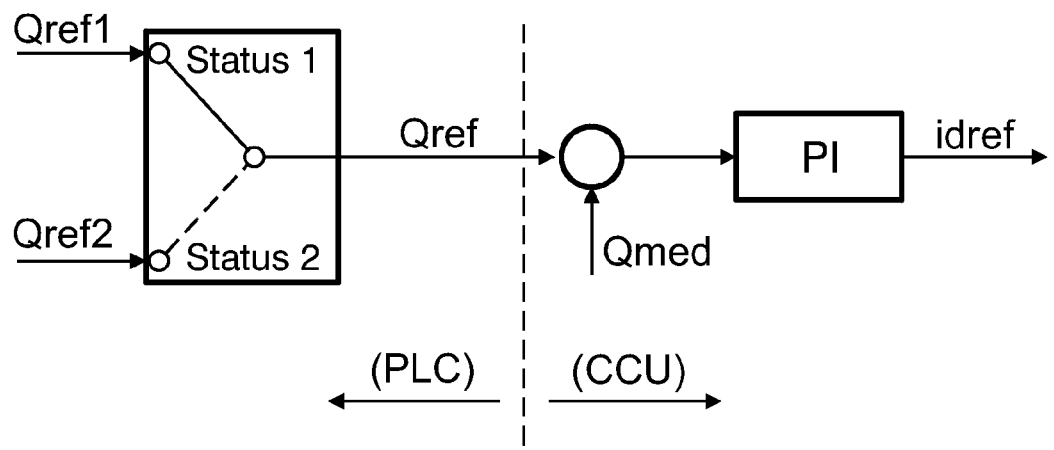

In a first preferred embodiment, shown in FIGS. 2A and 2B, the first and second set points are reactive power set points calculated in the wind turbine generator control unit (PLC).

Therefore, as can be observed in FIG. 2A, the stage in which the second reactive power set point (Qref2) for controlling the wind turbine generator is applied comprises the step of applying the second reactive power set point (Qref2) as an upper limit of the first reactive power set point (Qref1).

Alternatively, as shown in FIG. 2B, the stage in which the second reactive power set point (Qref2) for controlling the wind turbine generator is applied comprises the step of switching to the second reactive power set point (Qref2) from the first reactive power set point (Qref1). To this end, the control loop includes a switch having two states:

State 1, to which it switches when generator speed ($\omega_g$) is lower than the first speed limit ($\omega_{lim1}$) applying, in this case, the first reactive power set point (Qref1) as a reference for wind turbine generator reactive power control (Qref);

State 2, to which it switches when generator speed ($\omega_g$) is greater than or equal to the first speed limit ($\omega_{lim1}$) applying, in this case, the second reactive power set point (Qref) as a reference for wind turbine generator reactive power control (Qref2).

Next, the resulting reactive power set point (Qref) is sent to the power converter (CCU) control unit for wind turbine generator current control which, based on the difference between said resulting reactive power (Qref) and the measured reactive power (Qmed), will calculate the reference reactive current (idref) for the converter.

Figure 3A:
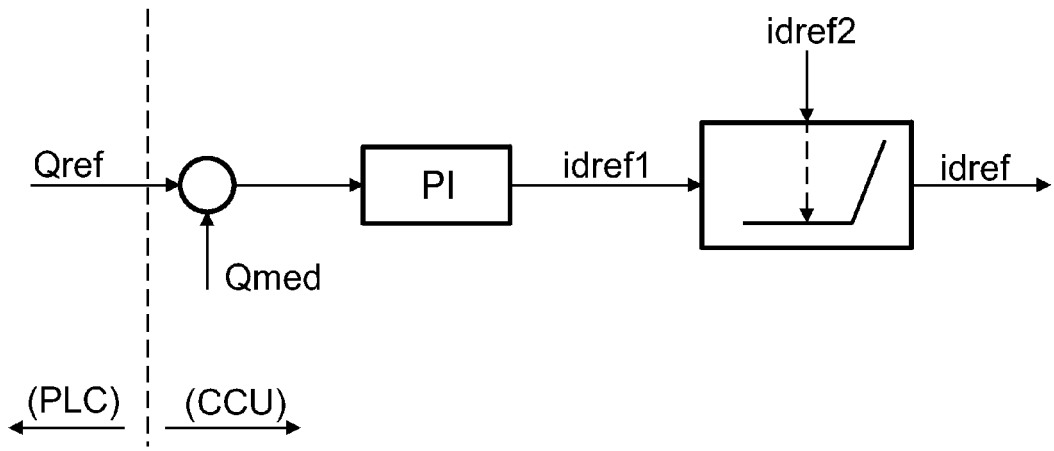
FIGS. 3A and 3B show two preferred embodiments where the first and second set points are reactive current set points calculated in the control unit of the CCU power converter.
Figure 3B:
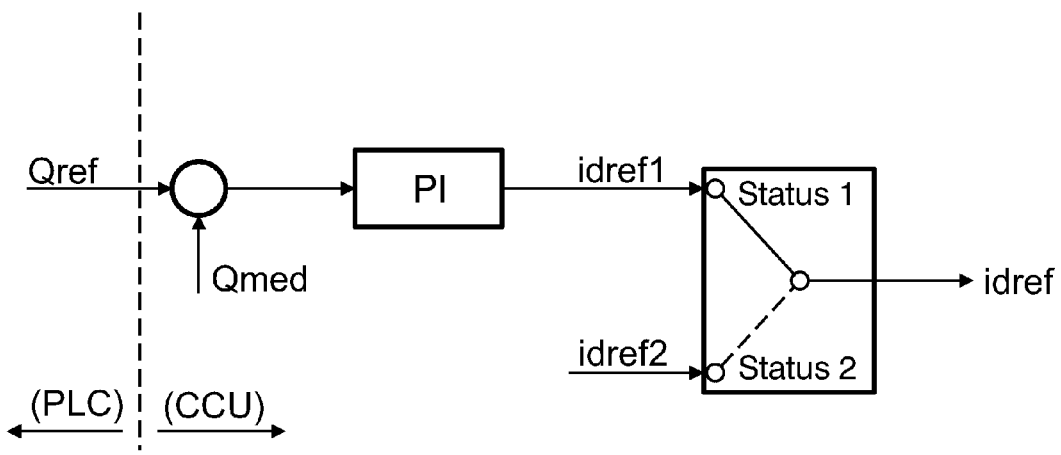

Further, in a second preferred embodiment, shown in FIGS. 3A and 3B, the first and second set points are reactive current set points calculated in the power converter control unit (CCU).

More specifically, the control loop represented in FIG. 3A shows that the stage of applying the second reactive current set point (idref2) for controlling the wind turbine generator comprises, according to this embodiment, the second reactive current set point (idref2) as the upper limit of the first reactive current set point (idref1).

Alternatively, as shown in the embodiment of FIG. 3b, the stage of applying the second reactive current set point (idref2) for controlling the wind turbine generator comprises the step of switching to the second reactive current set point (idref2) from the first reactive current set point (idref1). To this end, the control loop includes a switch having two states:

State 1, to which it switches when generator speed ($\omega_g$) is lower than the first speed limit ($\omega_{lim1}$) applying, in this case, the first reactive power set point (idref1) as a reference for wind turbine generator current control (idref);

State 2, to which it switches when generator speed ($\omega_g$) is greater than or equal to the first speed limit ($\omega_{lim1}$) applying, in this case, the second reactive power set point (idref2) as a reference for wind turbine generator current control (idref).

According to a preferred embodiment, the second set point (idref2, Qref2) is calculated based on a predetermined inductive reactive power value which can be identical to the maximum inductive power value that the generator can generate.

Figure 4:
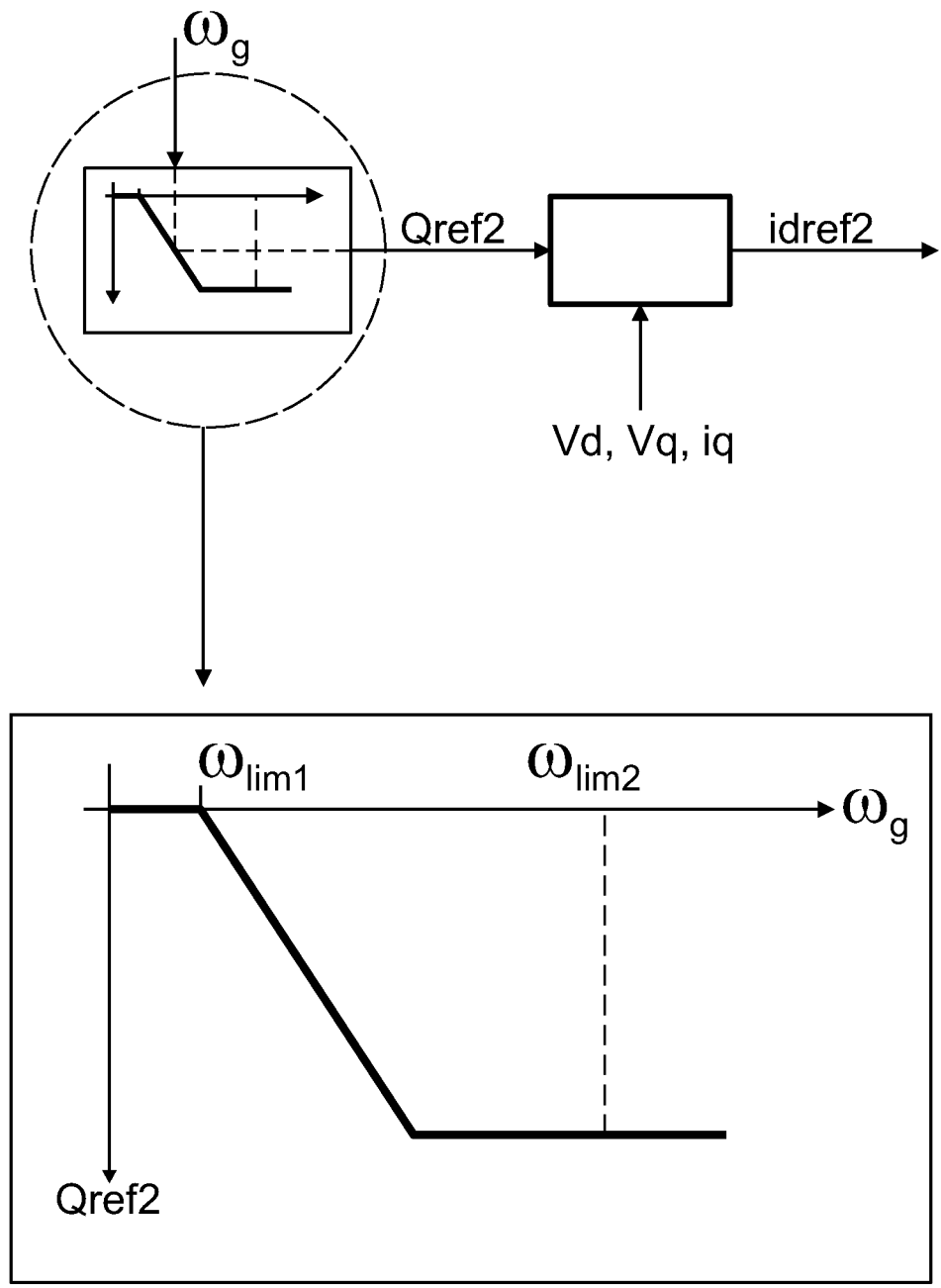
FIG. 4 shows a preferred embodiment where the second reactive current set point is calculated based on an inductive reactive power value calculated in accordance with generator speed.

Further, as can be observed in FIG. 4, according to an alternative embodiment, the second set point (idref2, Qref2) is calculated based on an inductive reactive power value calculated in accordance with generator speed ($\omega_g$). Said FIG. 4 shows how, on increasing the difference between generator speed ($\omega_g$) and the first speed limit ($\omega_{lim1}$), the inductive reactive power set point (Qref2) increases, with the ensuing effect of increasing the reduction in converter voltage or rotor voltage ($V_R$).

Additionally, in accordance with another preferred embodiment not represented herein, the first reactive current set point (idref1) is calculated based on a power factor set point (cos φ).

Moreover, it has been envisaged that, for wind turbine generator safety reasons, the control method object of the invention will also comprise:

calculation of the time interval during which rotational speed ($\omega_g$) is greater than the first speed limit value ($\omega_{lim1}$);

comparison of said time interval calculated using a predetermined maximum time interval; and disconnection of the wind turbine generator in the event that said time interval is greater than the maximum predetermined time interval.

Additionally, for the same safety reasons, in a preferred embodiment, the method additionally comprises the following stages:

comparing the rotational speed ($\omega_g$) calculated in stage a) with a second predetermined speed limit value ($\omega_{lim2}$) greater than the first speed limit value ($\omega_{lim1}$); and disconnecting the wind turbine generator in the event that rotational speed ($\omega_g$) is greater than the second speed limit value ($\omega_{lim2}$).

FIG. 4 also shows said second speed limit value ($\omega_{lim2}$) as of which the control unit sends a disconnection order to the wind turbine generator, otherwise a speed considerably exceeding said speed limit ($\omega_{lim2}$) could cause severe structural damage to the different components of the wind turbine generator.

Lastly, FIG. 5 shows an operation diagram of a wind turbine generator according to the control method described herein. Said diagram shows the evolution over time (t) of the rotational speed ($\omega_g$) of the reference reactive current (idref) and of the rotor voltage ($V_R$) or machine side converter voltage.

More specifically, said diagram shows that an increase in generator voltage ($\omega_g$) above a first speed limit value ($\omega_{lim1}$), which occurs after a time interval t1 according to the diagram of FIG. 1, causes recalculation of the first reactive current set point (idref1), whereupon a second inductive reactive current set point (idref2) is applied, causing a reduction in rotor voltage ($V_R$), as represented in said FIG. 1 in the time interval elapsed between t1 and t2.

This reduction in rotor voltage ($V_R$) results in a transitional increase in the speed range of the wind turbine generator, thereby preventing it from stopping and lengthening its service life on not being subject to continuous stops.

Said FIG. 1 represents, with a dashed line, the speed limit value according to the state of art ($\omega_{max}$(E.T.)) as of which current wind turbine generators stop for safety reasons as a consequence of a sudden increase in speed. As can be observed in the chart at the top of FIG. 1, the control method described herein enables an increase in the maximum speed limit allowed, as represented in the generator speed ($\omega_g$) for time interval t3.

In another aspect of the invention, the signal indicative of rotational speed ($\omega_g$) is compared with a second predetermined limit value greater than or equal to the first predetermined limit value and, in the event that the value of the signal indicative of rotational speed ($\omega_g$) is greater than the second limit value, the active power required from the electric generator is reduced by reducing torque.

Additionally, a signal indicative of the temperature of at least one electric element connected between the electric generator rotor and the grid—like the rotor winding temperature, although the temperature of any electric element connected between the electric generator rotor and the grid would do the work—is compared with a temperature threshold value and, if the value of said signal indicative of the temperature of an electric element connected between the electrical generator rotor—including the electrical generator rotor winding—and the grid exceeds said temperature threshold value, the active power required from the electric generator is reduced by reducing torque demand.

This measure is aimed at preventing overheating of any of the electric elements that connect the generator rotor to the grid. Said overheating is caused by electric power losses on passage of electric current. In situations of overspeed where electric slip increases, generator output distribution varies in a doubly fed induction generator, increasing the power circulating through the rotor. This can cause overheating of some of said electric elements that connect the generator rotor to the grid, including the generator rotor windings themselves, the wiring that connects the generator to the converter, the converter itself, the wiring that connects the converter to the transformer or the transformer itself or any harmonics filter connected there between. In this context, a signal indicative of the temperature of at least one electric element, such as the aforementioned elements, connected between the electric generator rotor winding and the grid can be the temperature measured in the rotor winding or the temperature measured in the rotor side converter, a measurement of the electric currents or of the temperature at any other point of the electric connections between the rotor of the generator and the grid.

The reduction in active power described in this aspect of the invention is carried out by means of a reduction in a torque demand to the electric generator. Given that active power P is the product of torque T multiplied by rotational speed ($\omega_g$), in the event of variations in rotational speed ($\Delta\omega_g$) and torque ($\Delta T$), the variation in power ($\Delta P$) is $$\Delta P = T \cdot \Delta\omega_g + \Delta T \cdot \omega_g$$

Therefore, in order for the variation in power ($\Delta P$) to be negative in the event of an increase in rotational speed ($\Delta\omega_g$), the following must be true:

$$\Delta T < -T \cdot \Delta\omega_g / \omega_g$$

The invention claimed is:

1. Control process of a wind turbine generator, said wind turbine generator comprising a wind rotor, at least two blades linked with said wind rotor, an electric generator, a control unit and a power converter connecting the electric generator to the grid, said control process comprising:
   a) determining a signal indicative of wind turbine generator rotational speed ($\omega_g$);
   b) establishing a first command (idref1, Qref1) for reactive current and/or reactive power;
   c) establishing a second command (idref2, Qref2) for reactive current and/or reactive power;
   d) comparing the signal indicative of rotational speed ($\omega_g$) with a predetermined first speed limit, in order to act in accordance with one of the following substages:
      d1) applying the first command (idref1, Qref1) for controlling the generator in the event that the signal indicative of rotational speed ($\omega_g$) calculated in stage a) is lower than the first speed limit value; and
      d2) applying the second command (idref2, Qref2) for controlling the generator in the event that the signal indicative of rotational speed ($\omega_g$) calculated in stage a) is greater than or equal to the first speed limit value.

2. The control process of a wind turbine generator of claim 1, wherein the second command (idref2, Qref2) is inductive.

3. The control process of a wind turbine generator of claim 2, wherein the stage d2) of applying the second command (idref2, Qref2) for controlling the generator comprises the step of applying the second command (idref2, Qref2) as the upper limit of the first command (idref1, Qref1).

4. The control process of a wind turbine generator of claim 1, wherein the stage d2) of applying the second command (idref2, Qref2) for controlling the generator comprises the step of switching to the second command (idref2, Qref2) from the first command (idref1, Qref1).

5. The control process of a wind turbine generator of claim 3 wherein the second command (idref2, Qref2) is calculated based on a predetermined inductive reactive power value.

6. The control process of a wind turbine generator of claim 3, wherein the second command (idref2, Qref2) is dependent on the signal indicative of rotational speed ($\omega_g$) and is calculated by means of a dependent function or table that relates the value of the first signal indicative of rotational speed ($\omega_g$) to the appropriate value for the second command (idref2, Qref2).

7. The control process of a wind turbine generator of claim 1, wherein the first command (idref1, Qref1) is calculated based on a reactive power command or power factor, obtained from a voltage controller the parameters of which are configured in accordance with grid integration requirements.

8. The control process of a wind turbine generator of claim 1, characterised in that the signal indicative of rotational speed ($\omega_g$) is the rotational speed ($\omega_g$) itself measured directly at the generator axis, while the first limit value with which it is compared is, likewise, a speed value ($\omega_{lim1}$).

9. The control process of a wind turbine generator of claim 1, characterised in that the signal indicative of rotational speed ($\omega_g$) is a voltage measurement made at the converter terminals on the generator side, or rotor voltage ($V_R$), the first limit value with which it is compared being a converter voltage limit value ($V_{Rlim1}$).

10. The control process of a wind turbine generator, of claim 1, comprising:
   comparing the signal indicative of rotational speed ($\omega_g$) with a predetermined second limit value greater than or equal to the predetermined first limit value; and
   reducing the active power demanded from the electric generator by reducing torque when the signal indicative of rotational speed ($\omega_g$) is greater than said second limit value.

11. The control process of a wind turbine generator, of claim 1, comprising:
   comparing a signal indicative of the temperature of at least one electric element connected between the electric generator rotor winding and the grid; and
   reducing the active power demanded from the electric generator when the value of the signal indicative of the temperature of an electric element connected between the electric generator rotor winding and the grid is greater than said threshold temperature value.

12. Wind turbine generator operating according to the control process described in claim 1.

13. The control process of a wind turbine generator of claim 4 wherein the second command (idref2, Qref2) is calculated based on a predetermined inductive reactive power value.

14. The control process of a wind turbine generator of claim 4, wherein the second command (idref2, Qref2) is dependent on the signal indicative of rotational speed ($\omega_g$) and is calculated by means of a dependent function or table that relates the value of the first signal indicative of rotational speed ($\omega_g$) to the appropriate value for the second command (idref2, Qref2).

15. Wind turbine generator operating according to the control process described in claim 2.

16. Wind turbine generator operating according to the control process described in claim 3.

17. Wind turbine generator operating according to the control process described in claim 4.

18. Wind turbine generator operating according to the control process described in claim 5.

19. A control process of a wind turbine generator said wind turbine generator comprising a wind rotor, at least two blades linked with said wind rotor, an electric generator, a control unit and a power converter connecting the electric generator to the grid, said control process comprising:
a) determining a signal indicative of wind turbine generator rotational speed ($\omega_g$);
b) establishing a first command (idref1, Qref1) for reactive current and/or reactive power;
c) establishing a second command (idref2, Qref2) for reactive current and/or reactive power;
d) comparing the signal indicative of rotational speed ($\omega_g$) with a predetermined first speed limit, in order to act in accordance with one of the following substages:
d1) applying the first command (idref1, Qref1) for controlling the generator in the event that the signal indicative of rotational speed ($\omega_g$) calculated in stage a) is lower than the first speed limit value;
d2) applying the second command (idref2, Qref2) for controlling the generator in the event that the signal indicative of rotational speed ($\omega_g$) calculated in stage a) is greater than or equal to the first speed limit value,
e) calculating the time interval during which rotational speed ($\omega_g$) is greater than the first speed limit value;
f) comparing said calculated time interval with a predetermined maximum time interval; and
g) disconnecting the wind turbine generator in the event that said time interval is greater than the predetermined maximum time interval.

20. The control process of a wind turbine generator of claim 19, further comprising:
comparing rotational speed ($\omega_g$) with a predetermined second speed limit value ($\omega_{lim2}$) greater than the first speed limit value ($\omega_{lim1}$); and
disconnecting the wind turbine generator in the event that rotational speed ($\omega_g$) is greater than the second speed limit value ($\omega_{lim2}$).

* * * * *